United States Patent [19]

Schuler

[11] Patent Number: 5,249,751

[45] Date of Patent: Oct. 5, 1993

[54] COMBINATION AUGER CONVEYOR AND FLAIL MEANS

[75] Inventor: Dorland H. Schuler, Griswold, Iowa

[73] Assignee: Schuler Manufacturing & Equipment Co., Inc., Griswold, Iowa

[21] Appl. No.: 947,840

[22] Filed: Sep. 21, 1992

[51] Int. Cl.⁵ .............................................. B02C 9/02
[52] U.S. Cl. .................... 241/222; 241/101.7; 241/101.8; 241/605
[58] Field of Search ............... 241/101.7, 260.1, 101.8, 241/605, 222

[56] References Cited

U.S. PATENT DOCUMENTS

| | | | |
|---|---|---|---|
| 3,916,605 | 11/1975 | Richards et al. | 241/222 |
| 4,201,348 | 5/1980 | Bigbee et al. | 241/101.8 |
| 4,432,499 | 2/1984 | Henkensiefken et al. | 241/30 |
| 4,438,885 | 3/1984 | Martin | 241/101.8 |
| 4,896,970 | 1/1990 | Schuler | 366/296 |
| 5,033,683 | 7/1991 | Taylor | 241/101 A |

Primary Examiner—Mark Rosenbaum
Assistant Examiner—John M. Husar
Attorney, Agent, or Firm—Zarley, McKee, Thomte, Voorhees, & Sease

[57] ABSTRACT

A flailer for cutting forage-type materials in a feed reel mixer or similar machine has a powered shaft with a plurality of flailing blades swingably mounted in a full helix fashion, and an arcuate hood for directing material into the path of the flailing blades and containing the resulting debris. An intake shield having a resilient flap attached thereto is mounted to the hood at its inlet to prevent undesirably large materials from entering the flailer. Another resilient flap at the outlet side of the hood directs cut materials down onto the auger and helps contain the dust from flailing. A second set of stationary blades mounted on the inside of the hood near its inlet cooperates with corresponding flailing blades to shear the materials in a series of smooth individual cuts, conserving power and reducing vibration.

11 Claims, 3 Drawing Sheets

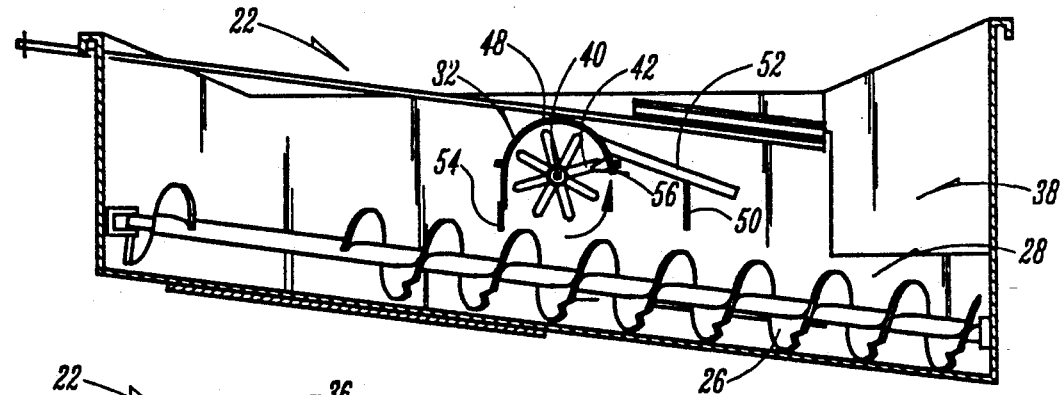
FIG. 3
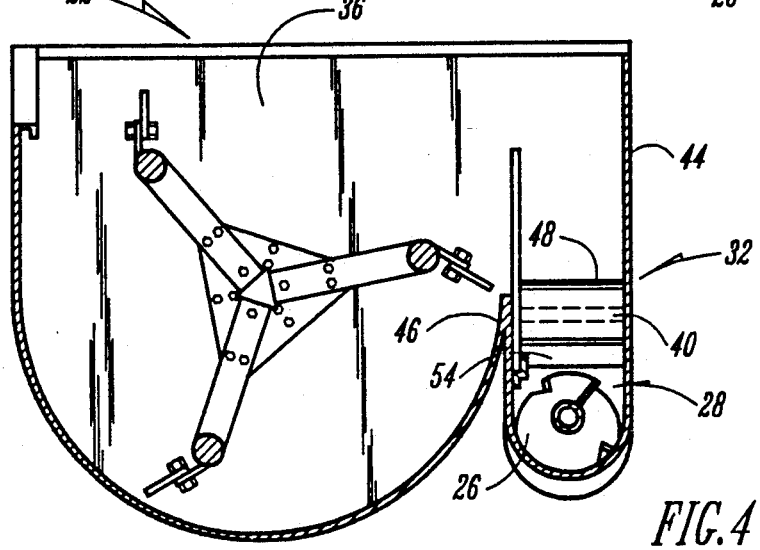
FIG. 4
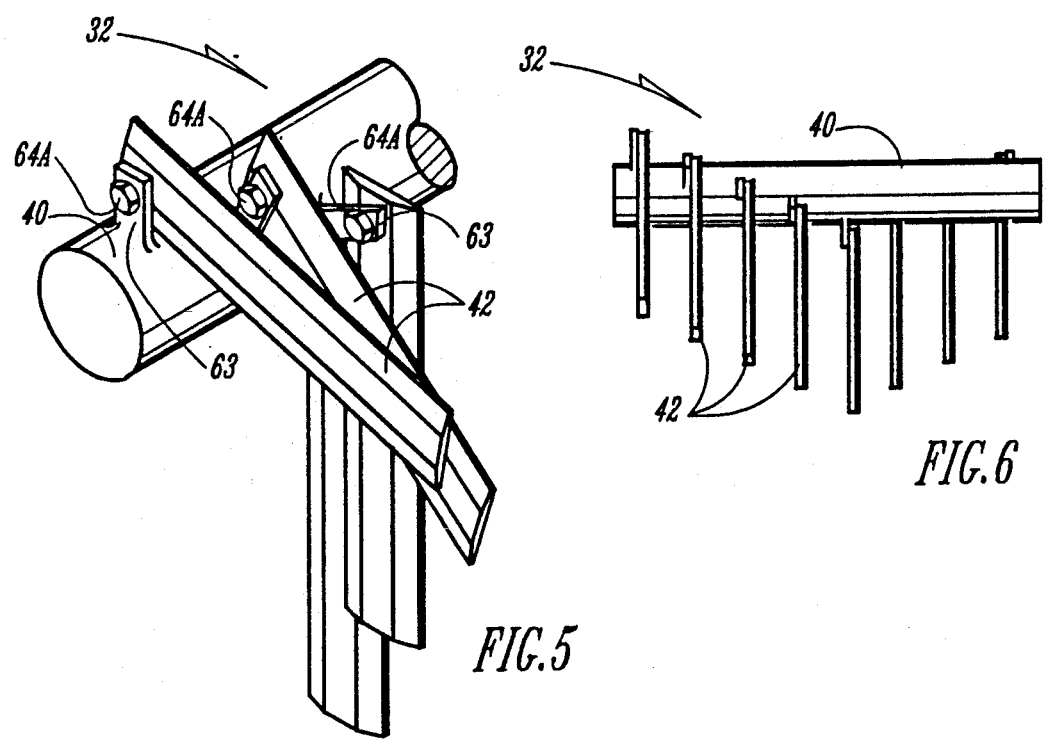
FIG. 5
FIG. 6

COMBINATION AUGER CONVEYOR AND FLAIL MEANS

BACKGROUND OF THE INVENTION

This invention relates to a feed reel mixer for use in mixing and dispensing feed hay and forage in dairy and beef operations. More particularly, this invention relates to a chopping or flailing wheel used to cut or shorten masses of hay or forage and feed the product back into the unloading auger of a feed wagon mixer.

Conventional feed mixers typically have an elongated chamber with a rotatable reel extending along the length of the chamber for mixing the feeds. An auger is often used to convey the feed from one end of the chamber to the other and discharge mixed feed.

These conventional feed mixers have shortcomings. One of these shortcomings is that the hay or forage being conveyed by the auger up an incline toward the discharge opening, have a tendency to clump, bind, and rise up out of the path of the auger. Slabs of hay and the like often move into the auger conveyor when they are not separated by the reel. As a result, some hay is not suitable for feeding in such wagons.

Accordingly, it is the primary objective of the present invention to provide a flailing means which will enable a feed reel mixer to efficiently process forage-type feeds into mixtures without impairing the operation of the auger.

Another objective of the present invention is to provide a flailing means which is durable, inexpensive to manufacture, and easy to mount in a conveying system.

Another objective of the present invention is to provide a flailing means which restricts the dust generated by flailing to the flailing area.

Another objective of the present invention is to provide a flailing means which shears or cuts forage materials in a smooth and power efficient manner.

SUMMARY OF THE INVENTION

A flail for cutting forage-type materials in a feed reel mixer or similar machine has a powered shaft with a plurality of flailing blades swingably mounted in a full circular fashion, and an arcuate hood for directing material into the path of the flailing blades and containing the resulting debris.

An intake shield having a resilient flap attached thereto is mounted to the hood at its inlet to prevent undesirably large materials from engaging the flail. Another resilient flap at the outlet side of the hood directs cut materials down onto the auger and helps contain the dust from the flail.

A second set of stationary blades mounted on the inside of the hood near its inlet cooperates with corresponding flailing blades to shear the materials in a series of smooth individual cuts, conserving power and reducing vibration. Beveled cutting edges on the flailing and stationary blades also improve cutting efficiency.

When mounted over the auger of a feed reel mixer and rotated, the flailing blades lift up accumulations of forage that rises above the auger and share it either on contact, or against the stationary blades on the hood. Cut forage is either dropped back onto the auger or swept to the outlet side of the hood by the flailing blades. Because of the directing hood and its attachments, most of the dust from flailing is contained within the auger conveying area. A uniformly chopped mixture results which is advantageous for feeding livestock.

DESCRIPTION OF THE DRAWINGS

FIG. 3 is a sectional view taken along line 3—3 of FIG. 2 showing the auger and the flailing means of the present invention in the conveying trough.

FIG. 4 is a sectional elevation view of a feed reel mixer taken along line 4—4 of FIG. 1 the reel mixer showing the relative location of the mixing reel, conveying auger, and flailing means of the present invention.

FIG. 5 is a perspective view showing the mounting of the flailing blades the present invention.

FIG. 6 is front perspective view of the shaft showing the helix mounting of the flailing blades in this invention.

PREFERRED EMBODIMENT OF THE INVENTION

Figure 1:
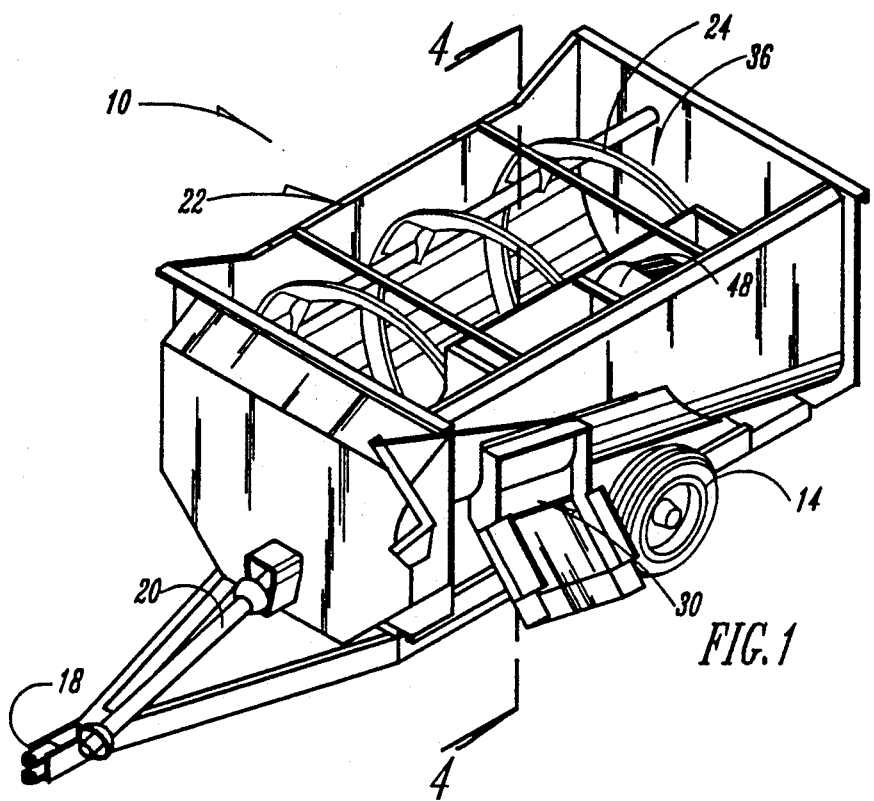
FIG. 1 is a perspective view of a feed reel mixer having the present invention.

A feed mixing wagon 10 is shown in FIG. 1. Such wagon mixers are typically used in feeding beef cattle, dairy cattle, or other livestock.

Wagon 10 has a frame 12 supported by at least two wheels 14 and 16 (not shown). The mixer is generally towed at hitch 18 by a conventional tractor or powered vehicle (not shown). Rotary power for the operation of the mixer is usually provided by a drive shaft 20 coupled to the power takeoff shaft of the towing vehicle.

Figure 2:
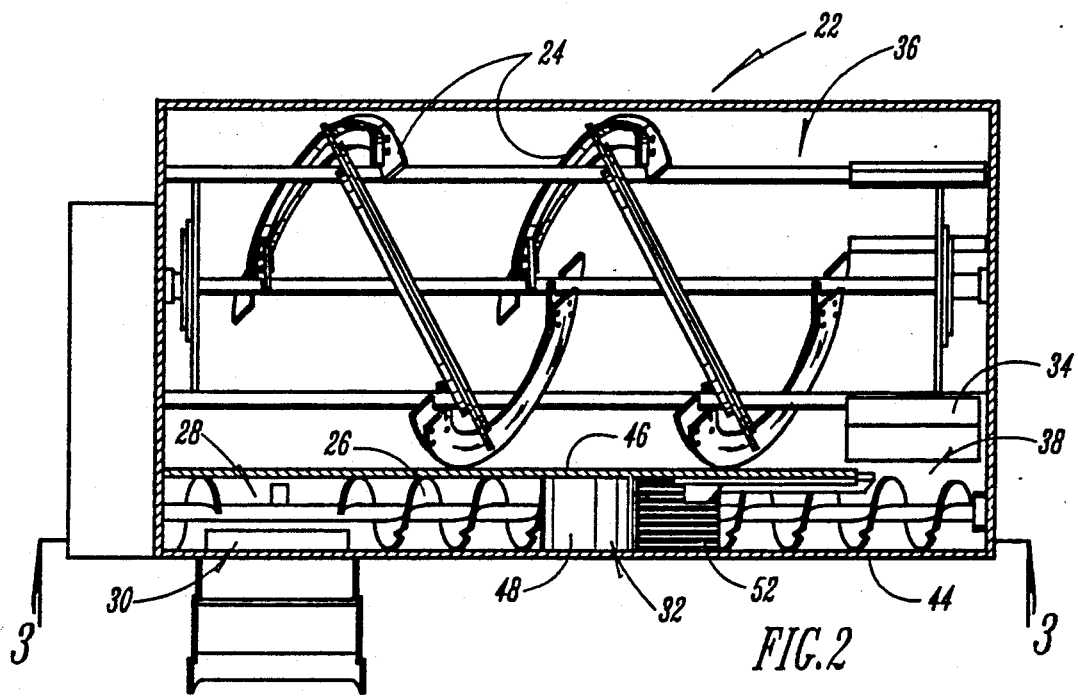
FIG. 2 is a top view of the mixing and conveying compartments of the feed reel mixer shown in FIG. 1.
Figure 7:
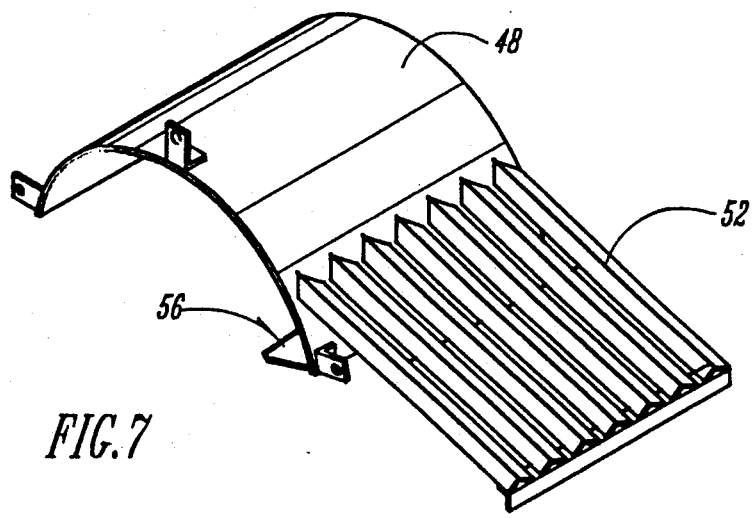
FIG. 7 is a perspective view showing the directing means which covers the flailing means of this invention.

An open-topped feed compartment 22 is mounted on top of the frame 12. Compartment 22 houses mixing reel 24 for moving and combining feeds which are loaded in top of the compartment. As shown in FIGS. 1, 2 and 3, an upwardly inclined auger 26 suspended in a U-shaped trough 28 conveys the feed toward a discharge opening 30 in the side of compartment 22.

Both the mixing reel 24 and auger shaft 26 are driven by drive shaft 20. A flailing means 32 mounted within trough 28 may be driven by this drive shaft or a separate suitable source of rotary power, such as a hydraulic motor (not shown). As shown in FIG. 2, a paddle wheel 34 transfers grain from the end of mixing compartment 36 to the U-shaped conveying trough 28 through opening 38. FIGS. 3 and 4 show that inlet opening 38 allows mixed feed from the mixer compartment 36 to be deposited at the lower end of auger 26 to be conveyed toward the discharge opening 30. In the preferred embodiment, the flailing means 32 of this invention is positioned in trough 28, above auger 26, approximately midway between inlet opening 38 and discharge opening 30.

Flailing means 32 includes a shaft 40 and a plurality of flailing blades 42 pivotally or swingably attached on arms 63 extending radially outwardly in a helical pattern from shaft 40. As shown in FIG. 4, shaft 40 is supported for rotation between the sidewalls 44 and 46 of conveyor trough 28 by conventional means. Rotary power from a suitable source turns the shaft 40 in a counterclockwise direction, as viewed in FIG. 3. In the preferred embodiment, shaft 40 is mounted with its major axis perpendicular to major axis of the auger. As shown in FIG. 5, shaft 40 has blades 42 attached at intervals around its periphery along a helical path. To maintain balance for smooth rotation, the helix of blades 42 should span the full circumference and be evenly spaced along the length of the shaft 40 as shown in FIG. 6.

Referring to FIG. 3, flailing means 32 also includes a directing hood 48 attached to at least one of the sidewalls 44, 46 of auger conveyor trough 28 by conventional means. Hood 48 partially covers the flailing blades 42 when the shaft 40 rotates them. An inlet deflector flap 50, made of rubber or similar material, is attached to shield 52 and extends straight down from its underside. The bottom of flap 50 is approximately even with the bottom of the extended flailing blade. Thus, the deflector 50 prevents large lumps of feed, which might jam the auger 26 or flailing means 32, from entering the flailing area. Flap 50 also keeps feed from being pushed back toward the lower end of the auger 26 by the counterclockwise rotation of the flailing means 32.

As shown in FIG. 3, shield 52 is attached to the side of directing hood 48 at its inlet, which is closest to inlet opening 38, and at least one of the sidewalls 44, 46 by conventional means. Shield 52 is downwardly inclined to restrict the size of the inlet for the flailing means 32.

The top portion of the flailing area is the covered by hood 48, but the lower portion, between blades 42 and auger 26 is left open for forage to enter. Among other things, the directing hood 48 directs flailed material back into the conveyor trough 28 and holds down the dust and debris generated during the flailing or chopping operation.

An outlet deflector flap 54 is attached to the outside of the directing hood 48 near its bottom edge, which is closest to the auger 26 and discharge opening 30. Flap 54 is constructed of rubber or similar material and extends downward from the hood 48 with its lowermost edge just above the auger 26. Thus, any forage which goes under the flail 32 and over the auger 26 is urged by flap 54 back into the flail 32 or auger 26. Flap 54 also directs gain from the flail 32 back into the blade of the auger 26 so it may be conveyed to the discharge opening 30. Flaps 50, 54 and shield 52 also help hood 48 in containing the dust generated by the operation of flailer 32.

Figure 8:
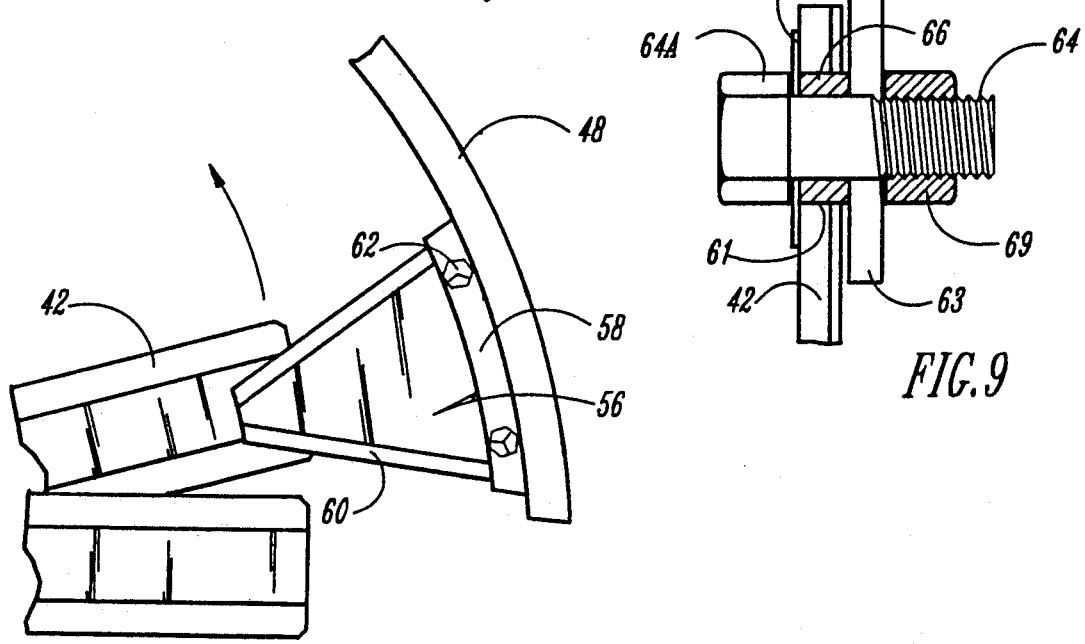
FIG. 8 is an enlarged view showing the rotation of the flailing blade against the corresponding knife on the directing means to s material in the present invention.
Figure 10:
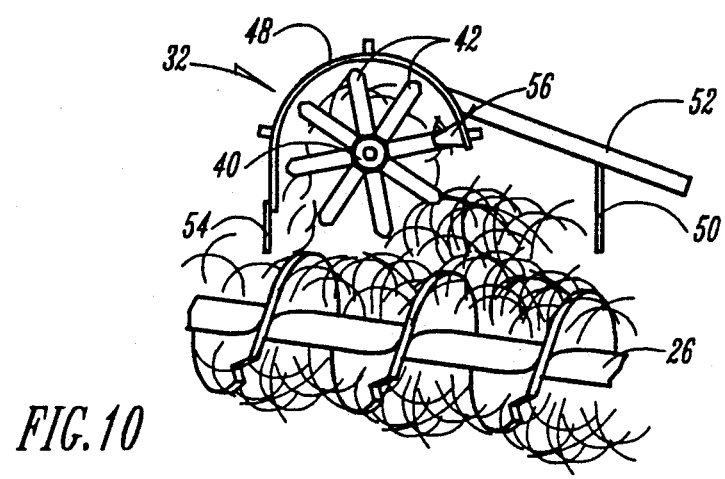
FIG. 10 is a perspective view depicting forage being chopped by the present invention.

As best shown in FIG. 8, a plurality of spaced apart knife assemblies 56 are attached in a row to the inner periphery of the inlet of directing hood 48. FIGS. 8 and 10 reveal that each knife assembly 56 corresponds to a flailing blade 42. They cooperate in a shearing fashion with each other to cut the longer forage which exists above the auger by the countercolockwise rotation of the flailing blades 42.

The shearing faces of both flailing blades 42 and knife assemblies 56 are beveled for more efficient cutting. Since only one set of blades is actually cutting at a given instant, power is conserved and the flail operates smoothly. In the preferred embodiment of the invention, the knife assemblies 56 are assembled and attached to hood 48 in the manner shown in FIG. 8. L-shaped brackets 58 are welded or otherwise attached to the inner arcuate surface of the hood 48. Each bracket 58 is fastened to its respective knife blade 60 by bolts 62.

Figure 9:
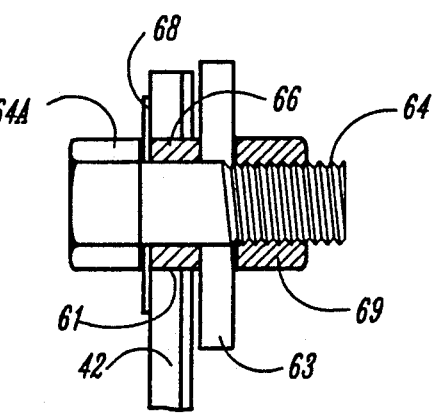
FIG. 9 is an enlarged view showing the fastening of the knives to their brackets on the directing means of the present invention.

FIG. 9 shows the detailed connection between flailing blades 42 and arms 63 that extend from shaft 40. Bolt 64 extends through aligned apertures in arm 63 and flailing blade 42. Bushing 66 is mounted within the aperture of blade 42 and bolt 64 is rotatably mounted within the bushing 66. A conventional washer 68 is located between the head 64A of bolt 64 and the blade 42. A nut 69 is mounted on bolt 64 adjacent arm 63 to hold the assembly together. It should be noted that the bushing 66 has a width greater than the thickness of blade 42 so that the blade will not bind on the arm 63.

The operation of the flailing means 32 is shown in FIG. 10. Mixed grains are delivered through inlet opening 38 to the downhill or inlet end of auger 26. As the forage is moved up the incline by the auger 26. As the forage is moved up the incline by the auger, slabs of forage may be located on top of the auger. Very large slabs of feed which might impair the operation of the auger or flailer, are held back by inlet deflector flap 50. The long forage which gets under the flap proceeds forward until it meets the flailing means 32. The counterclockwise rotating flailing blades 42 lift and cut the material, alone or in conjunction with the hood knife assemblies 56. Shaft speeds of around 600 revolutions per minutes are known to produce good cutting results on forage-type materials, but the invention is not limited to this speed. The cut material either falls back into the auger 26 or is swept counterclockwise around the inside of the directing hood 48 by the blades before falling back into the auger near the outlet deflector flap 54. Thus, the mixture delivered to discharge opening 30 will consist only of well chopped material.

Although the foregoing description of the present invention focused on supplying forage for livestock in a feed reel wagon, other applications are contemplated. The flailing means is also suitable for shredding cardboard, compost, or similar materials.

Therefore, it is apparent that the present invention accomplishes at least all of the objectives set forth earlier.

What is claimed is:

1. A conveying system for forage-type materials comprising:
    an elongated conveying trough having a curved bottom, substantially straight sidewalls, an inlet at one end and a discharge opening at another end;
    an auger mounted in said trough for conveying forage-type materials toward said discharge opening;
    a flailing means for chopping forage materials, into sizes suitable for conveyance by said auger, said flailing means being located above said auger between said inlet and said discharge opening to permit said flailing means to engage forage materials extending above said auger and moving through said trough, said engagement taking place away from the ends of the trough; and
    a source of power connected to said auger and said flailing means to rotate same.

2. The conveying system of claim 1 wherein said flailing means includes a shaft and a plurality of spaced-apart flailing blades mounted along the length of said shaft.

3. The conveying system of claim 2 wherein a second set of blades are mounted in the flailing means to cooperate with said flailing blades in shearing said forage-type materials.

4. The conveying system of claim 3 wherein said second set of blades is stationary and mounted to one of said sidewalls.

5. The flailing means of claim 1 wherein said shaft is perpendicular to said auger and said flailing blades are swingably fastened about said shaft so as to freely swing radially therefrom during the rotation of said shaft.

6. The flailing means of claim 5 wherein a set of stationary blades are mounted on the inside of said arcuate directing means to cooperate with said flailing blades in shearing forage-type materials.

7. The flailing means of claim 1 wherein an arcuate directing means is mounted over said auger for covering the upper portion of the path of said flailing means during rotation, thereby directing the materials into said flailing blades and downwardly into said auger after being flailed, and wherein said arcuate directing means has an inlet and an outlet, said inlet being associated with said auger inlet and said outlet being associated with said discharge opening, and wherein an intake shield is mounted adjacent to said directing means inlet, said intake shield being inclined downwardly toward said auger inlet for restricting access to said directing means and said flailing blades.

8. The flailing means of claim 7 wherein a resilient flap is mounted to said shield, said flap extending downwardly to restrict access of large materials to said flailing blades.

9. The flailing means of claim 7 wherein a resilient flap is mounted to said directing means outlet, said flap extending downwardly to direct materials cut by said flailing blade back onto said auger and reduce escape of same to the surrounding atmosphere.

10. The flailing means of claim 1 wherein at least one edge of said flailing blades is beveled for cutting forage-type materials.

11. The flailing means of claim 1 wherein a hollow hub, having a plurality of outwardly extending mounting flanges in a helix, surrounds said shaft and is fixed for rotation with same, said flails being attached to said hub mounting flanges.

* * * * *